(12) United States Patent
Akinpelu et al.

(10) Patent No.: US 7,630,307 B1
(45) Date of Patent: Dec. 8, 2009

(54) ARRANGEMENT FOR MINIMIZING DATA OVERFLOW BY MANAGING DATA BUFFER OCCUPANCY, ESPECIALLY SUITABLE FOR FIBRE CHANNEL ENVIRONMENTS

(75) Inventors: Akinwale A. Akinpelu, Leonardo, NJ (US); Arjun D. Kalra, New York, NY (US)

(73) Assignee: AT&T Intellectual Property II, LP, Reno, NV (US)

( * ) Notice: Subject to any disclaimer, the term of this patent is extended or adjusted under 35 U.S.C. 154(b) by 624 days.

(21) Appl. No.: 11/206,700

(22) Filed: Aug. 18, 2005

(51) Int. Cl.
*H04L 12/26* (2006.01)
(52) U.S. Cl. ..................................................... 370/229
(58) Field of Classification Search ................ 370/229, 370/230, 231, 232, 233, 235, 237
See application file for complete search history.

(56) References Cited

U.S. PATENT DOCUMENTS

| | | | |
|---|---|---|---|
| 5,991,266 A * | 11/1999 | Zheng | 370/229 |
| 6,480,477 B1 * | 11/2002 | Treadaway et al. | 370/314 |
| 6,810,031 B1 * | 10/2004 | Hegde et al. | 370/351 |
| 2001/0024432 A1 | 9/2001 | Zehavi et al. | |
| 2002/0178336 A1 * | 11/2002 | Fujimoto et al. | 711/165 |
| 2003/0065736 A1 | 4/2003 | Pathak et al. | |
| 2003/0202474 A1 | 10/2003 | Kreuzenstein et al. | |
| 2003/0218981 A1 * | 11/2003 | Scholten | 370/235 |
| 2003/0227874 A1 | 12/2003 | Wang | |
| 2005/0047334 A1 * | 3/2005 | Paul et al. | 370/229 |
| 2006/0159098 A1 * | 7/2006 | Munson et al. | 370/394 |

* cited by examiner

*Primary Examiner*—Derrick W Ferris
*Assistant Examiner*—Mohammad Anwar

(57) ABSTRACT

A method manages a communications link in which a first device (110) interfaces with a first channel extender (310) and in which a second device (120) interfaces with a second channel extender (320), and in which the first and second channel extenders (310, 320) communicate with each other through a communications medium (330). The method involves (FIG. 7A) monitoring an occupancy ("b") of a receive buffer (922+924) in the first channel extender (310) during transmission from the second channel extender (320) at a first transmission rate ($R_0$); (FIG. 7B) at a first time ($T_{hwm}$) when the occupancy of the receive buffer (922+924) exceeds a first threshold ($B_0+B_{cr}$), immediately instructing (718) the second channel extender (320) to cease transmission to the first channel extender (310); (FIG. 7C, 732) monitoring for an overflow condition in the receive buffer (922+924); if (FIG. 7D, 758) the overflow condition is present, specifying (760) that a future transmission to the first channel extender (310) be at a second transmission rate ($R'_0$) that is lower than the first transmission rate ($R_0$); and instructing (FIG. 7D, 762) the second channel extender (320) to resume transmission to the first channel extender (310).

17 Claims, 8 Drawing Sheets

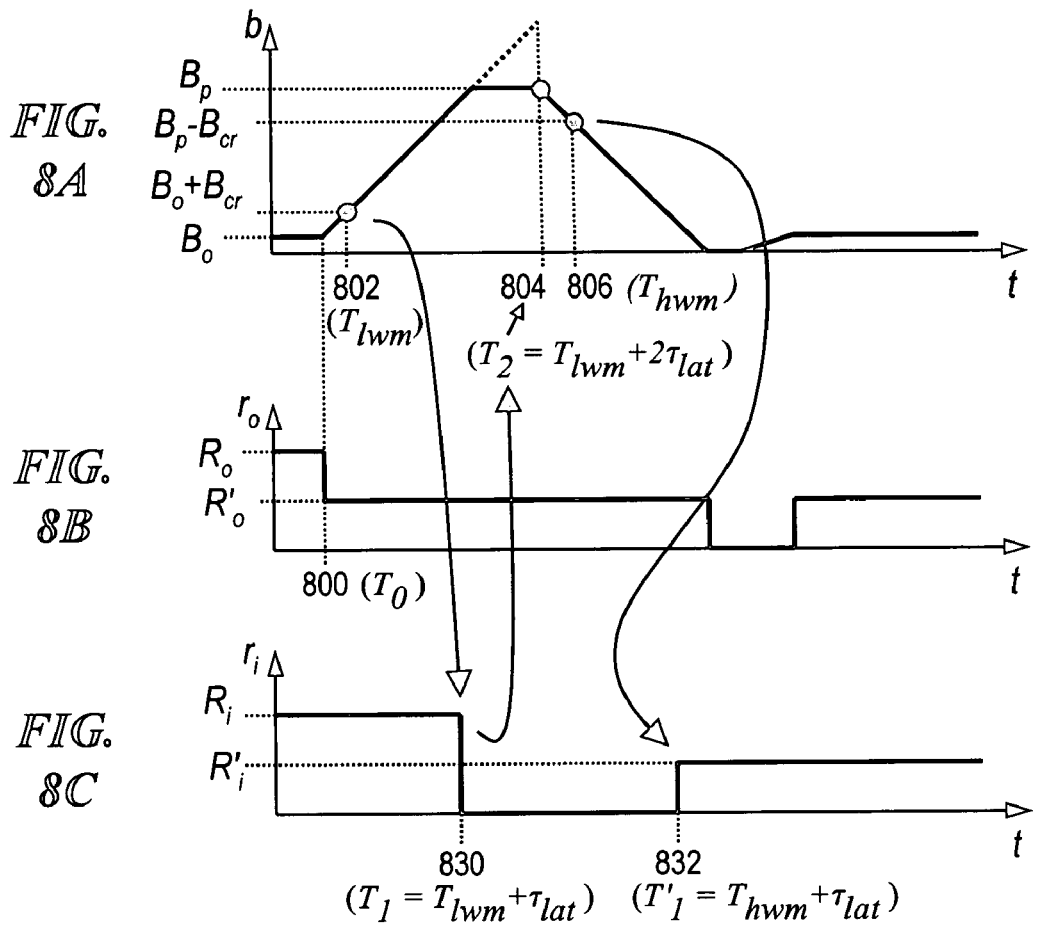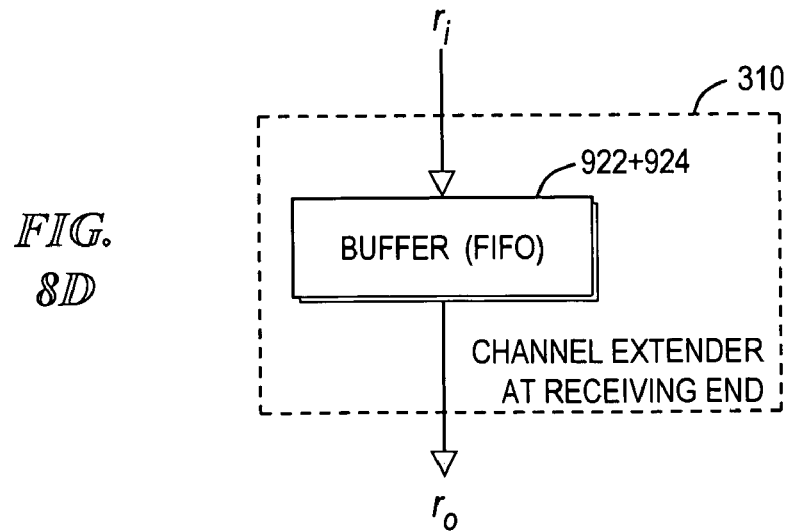

ARRANGEMENT FOR MINIMIZING DATA OVERFLOW BY MANAGING DATA BUFFER OCCUPANCY, ESPECIALLY SUITABLE FOR FIBRE CHANNEL ENVIRONMENTS

BACKGROUND OF THE INVENTION

1. Field of the Invention

This invention relates to minimizing data overflow in communications links. More specifically, the invention relates to arrangements for minimizing data overflow by managing data buffer occupancy, especially in a Fibre Channel (FC) environment.

2. Related Art

Fibre Channel (FC) technology is well known in the art. See, for example, Chapter 13.5 ("Fibre Channel") of William Stallings' *Data and Computer Communications* (Prentice-Hall, 1997), which like all documents cited herein, is incorporated by reference.

Fibre Channel (FC) provides a credit based flow control to protect against collisions and assure that the receiving port is not flooded with more data than it can handle. This approach avoids overrun and also provides a way to mitigate performance degradation over distance by allowing more in-flight frames. However, Fibre Channel has a detrimental impact on performance if extended distances separate source and destination devices.

Storage area network (SAN) users have deployed Fibre Channel Extender devices to minimize the performance degradation over extended distances. However, such devices, if not properly designed, can actually have adverse impact on system performance. For example, under various realistic conditions, channel extenders drop packets.

One approach involved use of a supplemental overflow data channel. For example, U.S. Patent Application Publication No. 2001/0024432 (Zehavi et al.) discloses an arrangement in which, when a data rate of a packet exceeds a capacity of a main channel, the packet is also transmitted on an overflow channel.

Other approaches have involved complex, distributed management schemes. For example, U.S. Patent Application Publication No. 2003/0065736 (Pathak et al.) discloses an arrangement in which nodes in a wireless data network keep track of an amount of memory that is reported to be available in a client device, so that a network essentially ensures that overflow does not occur in the client devices.

Another approach involves frame pull flow control in which frames remain in a first Fibre Channel device until they are requested by a second Fibre Channel device; see U.S. Patent Application Publication No. 2003/0202474 (Kreuzenstein et al.).

One approach to extending fibre channel performance range is disclosed in U.S. Patent Application Publication No. 2003/0227874 (Wang), which involves a supplemental buffer arrangement governed by a locally generated ready signal. The locally generated signal is substituted for the ready signal that would be remotely generated according to the Fibre Channel standard. Wang's transmitting node keeps a count of the remote buffer usage and stops sending frames if the remote buffer is full. This count is incremented when transmit node sends a frame to the remote node and is decremented when it receives a R_RDY (receiver ready) signal. Undesirably, such arrangements suffer performance degradation if the buffer at the remote node is less than a certain size, often owing to the effects of latency (round-trip communication delay) when awaiting R_RDY signals. Such performance degradation can persist even if there is no data rate mismatch.

Most Fibre Channel extenders, including the one disclosed by Wang patent, perform optimally if they operate within design parameters. However, as latency is increased beyond design values, performance decreases and usable bandwidth is wasted.

Accordingly, there is a need in the art for arrangements that adapt to increased latency or network impairment and still provide an optimal performance. Also, there is a need in the art for an arrangement that intelligently and transparently minimizes or eliminates data overflow, even over long distances and using Fibre Channel technology, thus allowing fulfillment of quality of service (QoS) guarantees. There is also a need in the art for an approach that minimizes dropped traffic to an insignificant amount, and, further, that is generic enough to adapt to all data rates and distances between the source and destination devices.

SUMMARY

A method manages a communications link in which a first device interfaces with a first channel extender and in which a second device interfaces with a second channel extender, and in which the first and second channel extenders communicate with each other through a communications medium. The method involves monitoring an occupancy of a receive buffer in the first channel extender during transmission from the second channel extender at a first transmission rate; at a first time when the occupancy of the receive buffer exceeds a first threshold, immediately instructing the second channel extender to cease transmission to the first channel extender; monitoring for an overflow condition in the receive buffer; if the overflow condition is present, specifying that a future transmission to the first channel extender be at a second transmission rate that is lower than the first transmission rate; and instructing the second channel extender to resume transmission to the first channel extender.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which:

FIGS. 8A, 8B, 8C, 8D are collectively referred to as "FIG. 8", in which

FIGS. 8A, 8B, and 8C constitute timing diagrams showing buffer occupancy and I/O data rate for one embodiment, and FIG. 8D shows a buffer with its input data rate $r_i$ and output data rate $r_o$.

DETAILED DESCRIPTION

Figure 1:
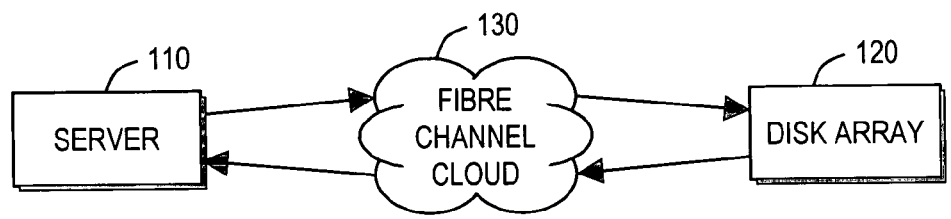
FIG. 1 shows a conventional point-to-point Fibre Channel communication system in a storage area network (SAN)

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, initiation and termination of loops, and the corresponding incrementing and testing of loop variables, may be only briefly mentioned or illustrated, their details being easily surmised by skilled artisans. Thus, the steps involved in methods described herein may be readily implemented by those skilled in the art without undue experimentation.

Further, various aspects, features and embodiments may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

Fibre Channel (FC) provides a credit based flow control to protect against collisions and to assure that the receiving port is not flooded with more data than it can handle. This arrangement not only avoids overruns but also provides a way to mitigate performance degradation over distance by allowing more in-flight frames. A port is designed with a fixed amount of storage capacity, to accept a given number of frames. On power up, each port logs into a fabric, if present, or to an N-port. Several parameters are exchanged, including the amount of data that can be transferred without receiving an acknowledgement. Flow control uses a buffer-to-buffer (B2B) credit mechanism. Storage capacity is referred to in terms of buffer-credits, and acknowledgement is referred to as R_RDY (receiver ready). A port sends only the number of frames equal to the buffer-to-buffer credit of the receiving port.

FIG. 1 shows an example of a simple point-to-point Fibre Channel setup. A server 110 accesses disks in disk array 120 over a network shown as a Fibre Channel (FC) cloud 130. The transmission network can include a DWDM system that transports FC frames in their native format. Alternatively, it may encapsulate the FC frames over a widely popular protocol such as SONET (synchronous optical network). For this discussion, the B2B credit for the server is denoted N. That is, disk array 120, in response to a read request, will only send N frames before it receives R_RDY from server 110.

Fiber Channel performance is known to degrade over distance. As the distance between the FC devices increases beyond a certain point, system performance deteriorates because the "pipe" between the devices is not completely full. That is, the sending FC device is idle between two transmission cycles.

Figure 2:
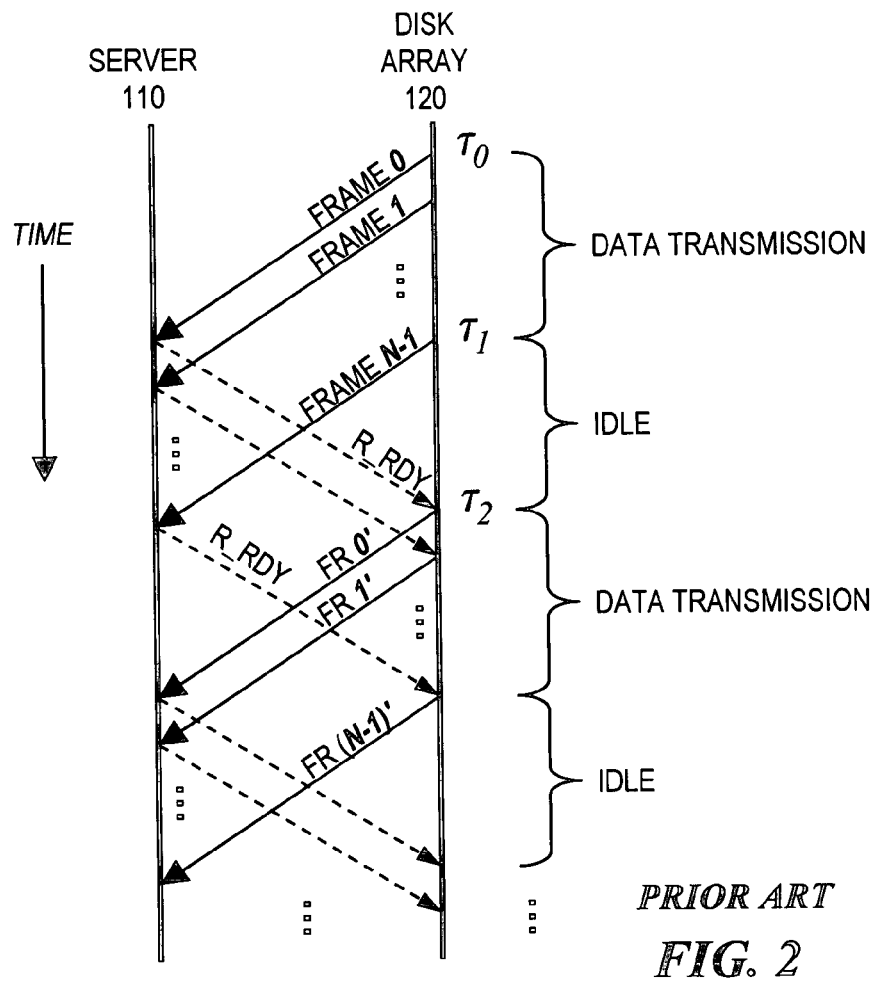
FIG. 2 is a flow diagram in a conventional Fibre Channel system.

This scenario is shown in shown in FIG. 2, which shows an example of data flow from disk array 120 to server 110. In FIG. 2, solid lines with arrowheads denote transmission of frames, and dotted lines with arrowheads denote receiver ready (R_RDY) acknowledgements.

In response to a read request, disk array 120 sends N frames and waits for the first R_RDY from server 110. The first frame ("Frame 0") is transmitted at time $\tau_0$. The $N^{th}$ frame ("Frame N−1") is transmitted at time $\tau_1$. Due to extended distance between the server and disk array, the first R_RDY is not received until time $\tau_2$. The disk array is idle for a time period equal to $\tau_2-\tau_1$.

According to one embodiment, to minimize performance degradation, the B2B credit of the receiving device meets the following relationship:

$$N \geq 2 \cdot \tau_{lat} \cdot \frac{r_f}{s_f} + 1 \quad \text{(Equation 1)}$$

in which:

N=buffer-to-buffer credit of the receiving FC port $r_f$=FC line rate (in one example, $1.0625 \cdot 10^9$ or $2.125 \cdot 10^9$ bits/s)

$s_f$=FC frame size (in one example, 36+2148=2184 bytes)

$\tau_{lat}$ is latency and is explained as follows.

For purposes of the present discussion, latency is defined as the total elapsed for one data bit to travel from source to the destination. It is a function of distance between source and destination as well as the characteristics of the communication equipment. Latency can be expressed as:

$$\tau_{lat} = \frac{d}{v_f} + \tau_p + \tau_b \quad \text{(Equation 2)}$$

in which:

d=distance between data source and destination devices;

$v_f$=velocity of light in fiber ($\approx 2 \cdot 10^8$ km/s);

$\tau_p$=data processing time at the source device; and $\tau_b$=buffering time at the source device.

In a real system the processing and buffering time are negligible in comparison to the latency due to the distance between the devices and, therefore, may be ignored in the following discussion.

Figure 3:
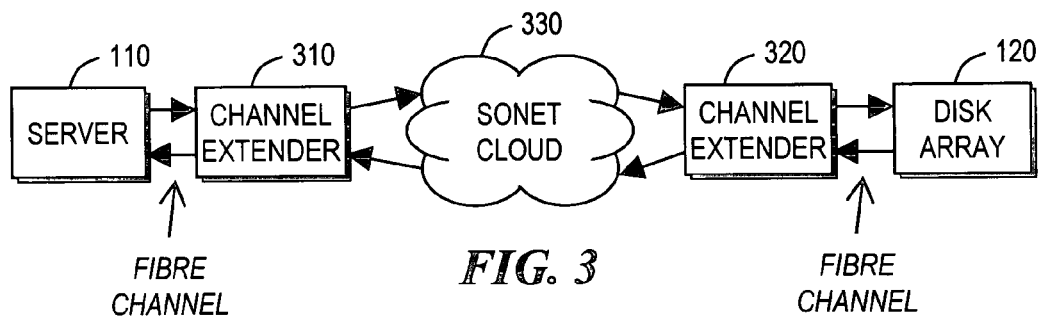
FIG. 3 shows a point-to-point SAN including channel extenders.

FIG. 3 shows a networking arrangement for extending Fibre Channel using channel extension technology. In one embodiment, first and second end devices 110, 120 are embodied by a SAN server 110 and disk array 120 from FIG. 1. In FIG. 3, first and second channel extenders 310, 320 are associated with server 110 and disk array 120, respectively. First FC extender 310 interfaces server 110 to a communications network 330 which may be a SONET (synchronous optical network) cloud. Similarly, second FC extender 320 interfaces disk array 120 to network 330.

Briefly, channel extenders 310, 320 minimize performance degradation by sending an acknowledgement to the Fibre Channel devices 110, 120 even though the data may not have reached the destination. This function, called "spoofing," tricks the Fibre Channel transmitting device into thinking that acknowledgement was sent by the receiving device.

Figure 4:
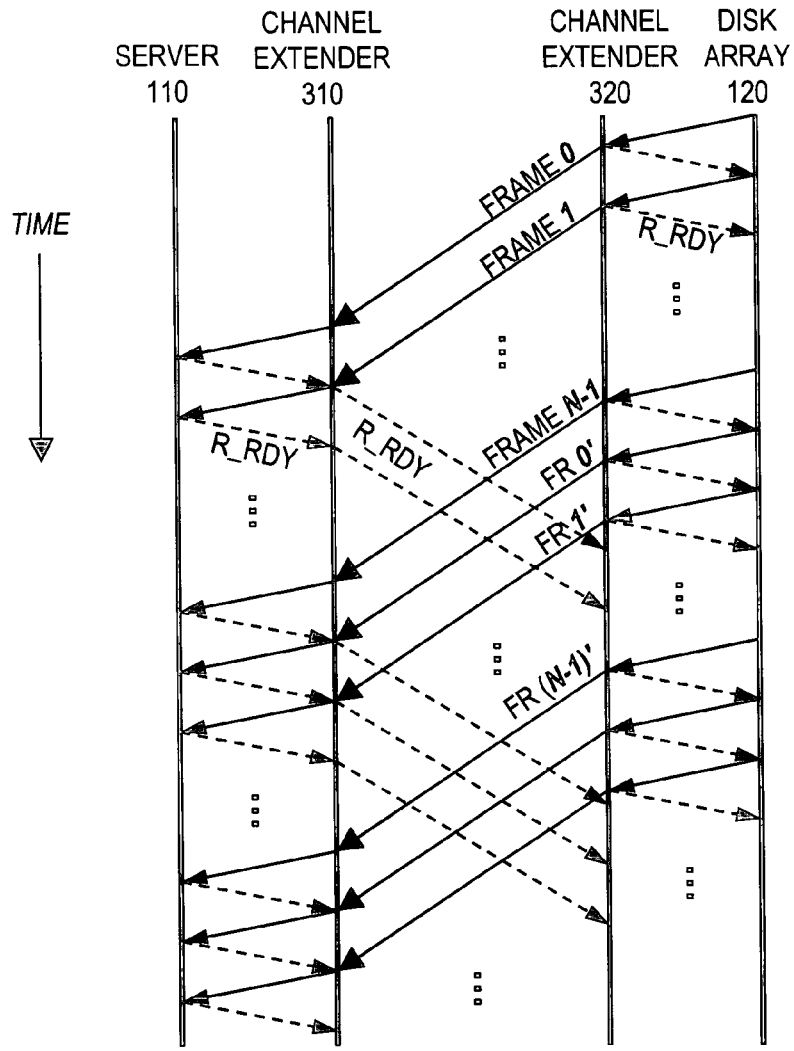
FIG. 4 is a flow diagram showing a spoofing technique allowing Fibre Channel to operate at full wire speed.

FIG. 4 illustrates a spoofing technique allowing Fibre Channel to operate at full wire speed. This technique ensures a reliable and error free transport, and minimizes loss of data. Previously, data loss could occur if there exists an imbalance in receive and transmit data rates at the destination node. This imbalance in data rates causes data overflow.

Some embodiments of channel extenders include buffer memory to temporarily store the overflow data. One embodiment actually includes two buffers, namely:

▷ A credit buffer (CrB) (FIG. 9 element 922) stores received Fibre Channel frames and plays them out when requested by the destination node. When the CrB is completely full, channel extenders invoke a flow control mechanism that sends a message to the source device to stop data transmission.

▷ An overflow buffer (OvB) (FIG. 9 element 924) stores the in-flight data packets while flow control signal is in transit.

In summary, certain embodiments of channel extenders perform some or all of the following functions:

Utilize "spoofing" to facilitate fast and error free transport
Detect data overflow condition
Save overflow data in a local buffer memory
Invoke flow control to minimize lost data
Other functions not specifically listed.

In steady state operation, incoming data is stored in CrB using first-in-first-out (FIFO) method. That is, data is stored on the top of the CrB and read from the bottom.

Figure 5A:
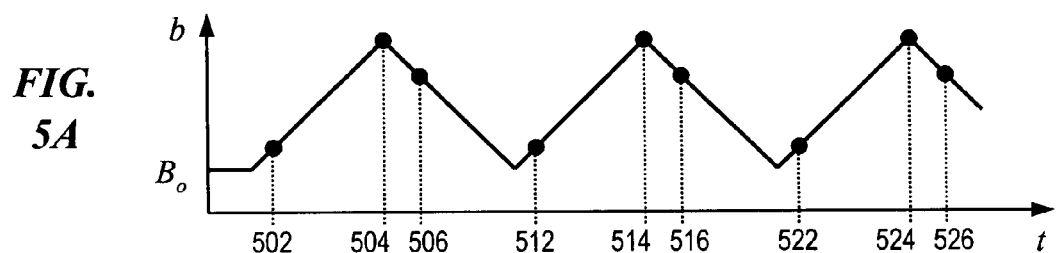
FIGS. 5A, 5B, and 5C (collectively referred to as "FIG. 5") constitute timing diagrams showing buffer occupancy and input/output (I/O) data rate for lossless transmission.
Figure 5B:
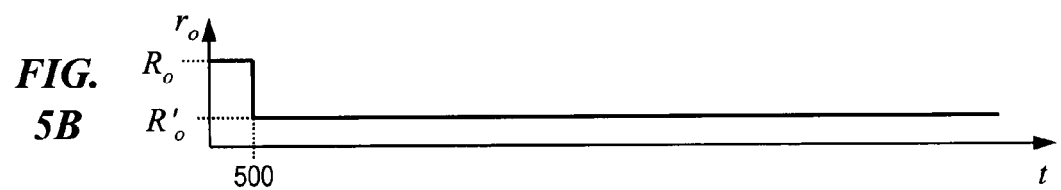
Figure 5C:
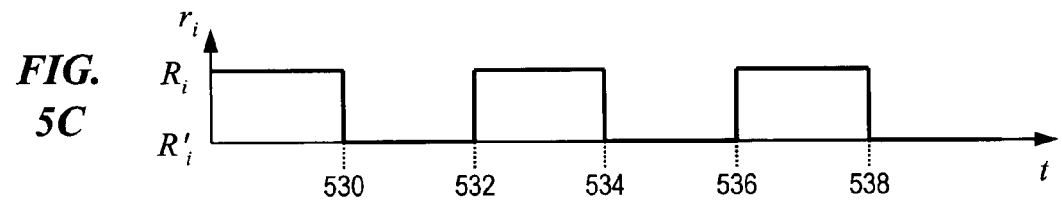

FIGS. 5A, 5B, and 5C (collectively referred to herein as "FIG. 5") constitute timing diagrams showing buffer occupancy and input/output (I/O) data rate for lossless transmission. In particular, at the destination node:

FIG. 5A shows buffer occupancy b;
FIG. 5B shows transmission (output) data rate $r_o$; and
FIG. 5C shows receive (input) data rate $r_i$.

The times and function values at times shown in FIGS. 5A, 5B, and 5C are presented in the following chart:

| Legend for FIG. 5 | | |
|---|---|---|
| FIG. 5 reference | Time t | Function value |
| FIG. 5B: | | |
| 500 | $T_0$ | $r_o = R_0 \to R_0'$ |
| FIG. 5A: | | |
| 502 | $T_{lwm}$ | $b = B_0 + B_{cr}$ |
| 504 | $T_2$ | $b = B_p = B_0 + B_{cr} + B_{ovf}$ |
| 506 | $T_{hwm}$ | $b = B_0 + B_{ovf}$ |
| 512 | $T_{lwm}'$ | $b = B_0 + B_{cr}$ |
| 514 | $T_2'$ | $b = B_p = B_0 + B_{cr} + B_{ovf}$ |
| 516 | $T_{hwm}'$ | $b = B_0 + B_{ovf}$ |
| 522 | $T_{lwm}''$ | $b = B_0 + B_{cr}$ |
| 524 | $T_2''$ | $b = B_p = B_0 + B_{cr} + B_{ovf}$ |
| 526 | $T_{hwm}''$ | $b = B_0 + B_{ovf}$ |
| FIG. 5C: | | |
| 530 | $T_1 = T_{lwm} + \tau_{lat}$ | $r_i = R_i \to R_i'$ |
| 532 | $T_{1h} = T_{hwm} + \tau_{lat}$ | $r_i = R_i' \to R_i$ |
| 534 | $T_1' = T_{lwm}' + \tau_{lat}$ | $r_i = R_i \to R_i'$ |
| 536 | $T_{1h}' = T_{hwm}' + \tau_{lat}$ | $r_i = R_i' \to R_i$ |
| 538 | $T_1'' = T_{lwm}'' + \tau_{lat}$ | $r_i = R_i \to R_i'$ |

Under normal operating conditions the transmit and receive data rates are equal ($R_i = R_o$), and CrB contains a small number $B_0$ of bytes ($b = B_0$). Here, $r_i = R_i$ and $r_o = R_o$ are the input and output data rates, respectively.

One embodiment of the method continuously monitors buffer occupancy b. Control remains in a steady state loop for so long as the output and input data rates are essentially matched (see FIG. 7A, described below). However, if there a mismatch develops in the data rate such that $r_i > r_o$, the method exits the steady state loop and invokes flow control (see FIG. 7B, described below). Flow control minimizes system performance degradation.

A scenario for flow control invocation is now briefly described. At time $T_0$ (500 in FIG. 5B), an equipment or transmission failure causes the drain (output) data rate to drop to $R_0'$. The data rate imbalance ($R_i > R_o'$) results in excess data that will be stored in CrB. The buffer occupancy immediately after $T_0$ can be expressed as:

$$b = B_0 + (R_i - R_o')(t - T_0)$$

If the drain rate stays at $R_i'$, the CrB will eventually fill up at time $t_c$:

$$t = t_c = T_0 + \frac{B_{cr}}{r_i - r_o}$$

The channel extender invokes flow control by sending a signal to the source device to stop data transmission so that the CrB can be emptied and to avoid buffer overflow.

Figure 7:
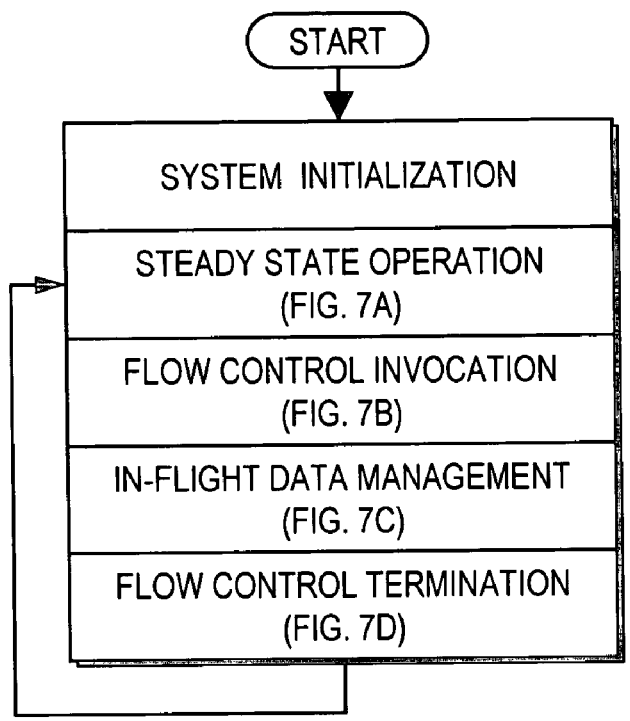
FIG. 7 shows system initialization and the relationship of FIGS. 7A, 7B, 7C, 7D.
Figure 7A:
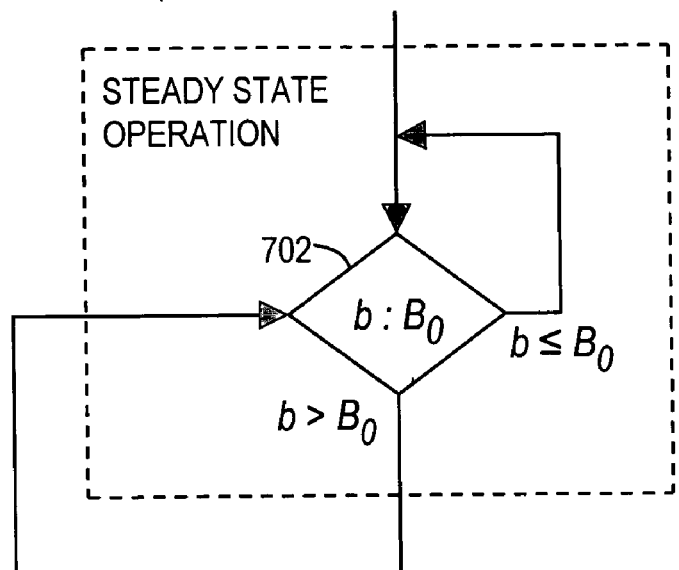
FIG. 7A shows a flowchart of one embodiment of steady state operation.
Figure 7B:
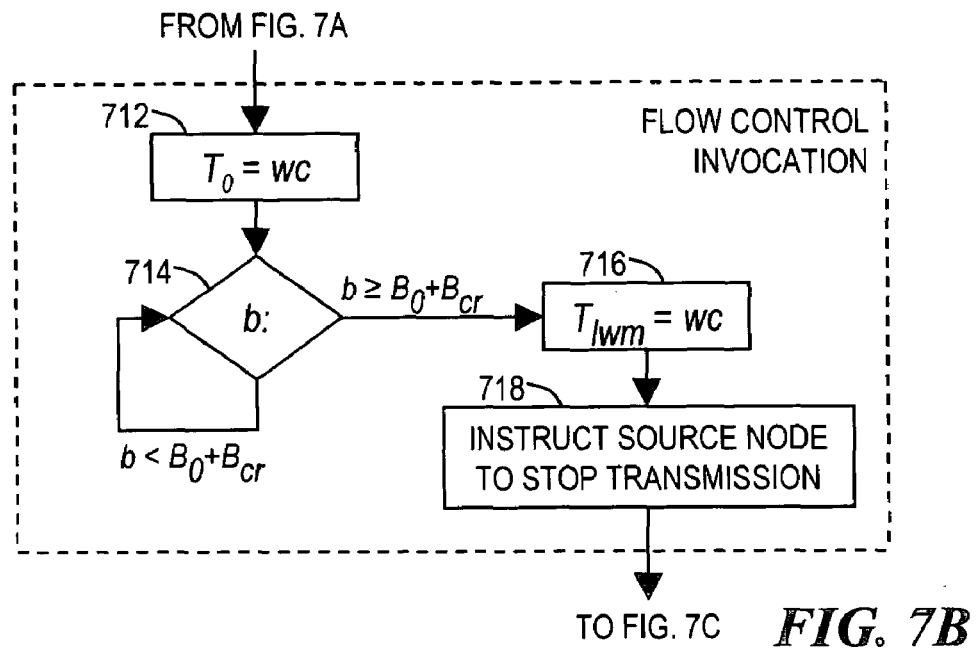
FIG. 7B shows a flowchart of one embodiment of flow control invocation.
Figure 7C:
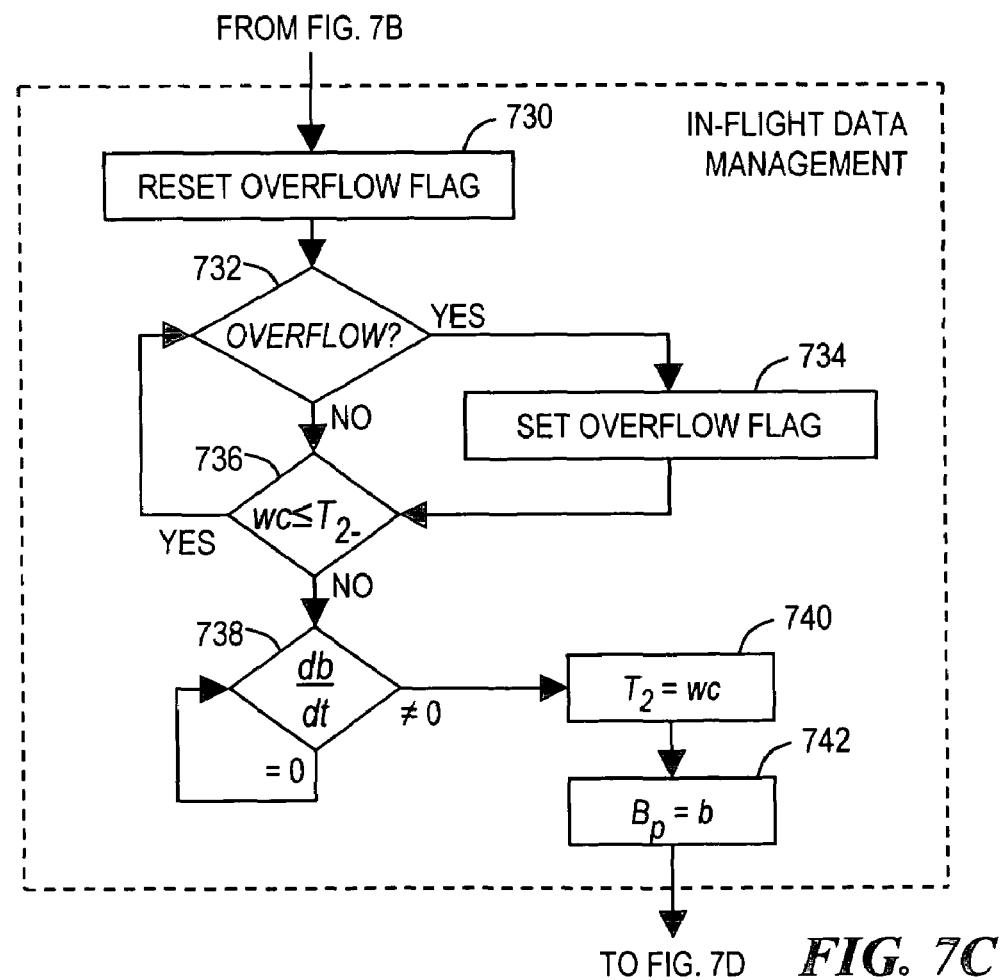
FIG. 7C shows a flowchart of one embodiment of in-flight data management.

The management of data during the time after flow control is invoked (FIG. 7B) and the time flow control is terminated (FIG. 7D) is referred to herein as in-flight data management (FIG. 7C). During in-flight data management, the flow control message sent by the destination channel extender at time $T_{lwm}$, reaches the source channel extender at time $T_1 = T_{lwm} + T_{lat}$, where $\tau_{lwm}$ is propagation delay latency. Upon receipt of the flow control message, the source device immediately ceases data transmission. Due to latency, the last bit of in-flight data will arrive at the destination channel extender at time $T_2 = T_{lwm} + 2\tau_{lat}$.

The excess-in-flight data, $R_i - R_o'$, is saved in the OvB. OvB size is a function of the distance between source and destination devices and their data rate. The optimum buffer size for a given distance and data rate of the can be expressed as:

$$b_{ovf} > 2 \cdot \frac{d}{v_f} \cdot (R_i - R_o')$$

If OvB is less than the optimum size shown above, some of the data will be lost (see FIG. 6). FIG. 6 is a lossy scenario, distinguished from FIG. 5's lossless scenario in which OvB satisfies the above condition.

Figure 6A:
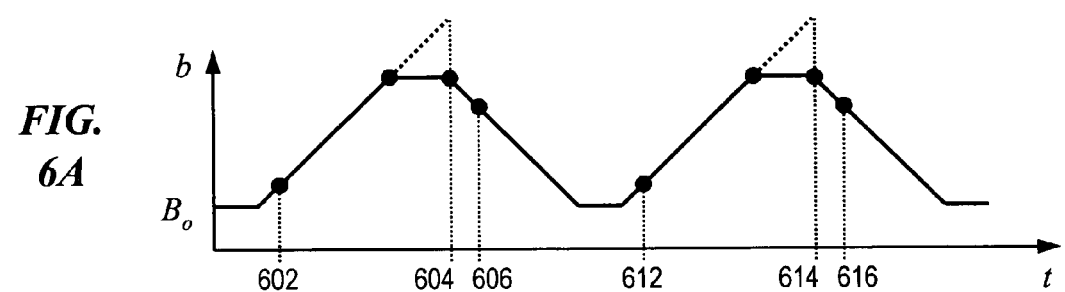
FIGS. 6A, 6B, and 6C (collectively referred to as "FIG. 6") constitute timing diagrams showing buffer occupancy and I/O data rate for lossy transmission.
Figure 6B:
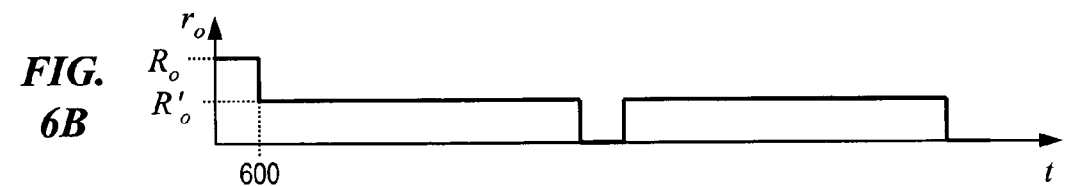
Figure 6C:

The times and function values at times shown in FIGS. 6A, 6B, and 6C are presented in the following chart:

| Legend for FIG. 6 | | |
|---|---|---|
| FIG. 6 reference | Time t | Function value |
| FIG. 6B: | | |
| 600 | $T_0$ | $r_o = R_0 \to R_0'$ |
| FIG. 6A: | | |
| 602 | $T_{lwm}$ | $b = B_0 + B_{cr}$ |
| 604 | $T_2$ | $b = B_p = B_0 + B_{cr} + B_{ovf}$ |
| 606 | $T_{hwm}$ | $b = B_0 + B_{ovf}$ |
| 612 | $T_{lwm}'$ | $b = B_0 + B_{cr}$ |
| 614 | $T_2'$ | $b = B_p = B_0 + B_{cr} + B_{ovf}$ |
| 616 | $T_{hwm}'$ | $b = B_0 + B_{ovf}$ |

-continued

Legend for FIG. 6

| FIG. 6 reference | Time t | Function value |
|---|---|---|
| FIG. 6C: | | |
| 630 | $T_1 = T_{lwm} + \tau_{lat}$ | $r_i = R_i \to R_i'$ |
| 632 | $T_{1h} = T_{hwm} + \tau_{lat}$ | $r_i = R_i' \to R_i$ |
| 634 | $T_1' = T_{lwm}' + \tau_{lat}$ | $r_i = R_i \to R_i'$ |
| 636 | $T_{1h}' = T_{hwm}' + \tau_{lat}$ | $r_i = R_i' \to R_i$ |

FIG. 6 and the foregoing analysis show that the loss of data persists as long as the rate imbalance exists. The embodiment to be described below detects rate imbalances and invokes a flow control mechanism that minimizes loss of data and limits the duration of data loss to one round trip latency.

Before a more detailed description of the embodiment is presented, flow control termination now briefly introduced (see FIG. 7D, described below). At time $T_0 + 2\tau_{lat}$, the last in-flight data arrives at the destination device. The destination channel extender waits until a minimum of $B_{cr}$ data bytes have been played out. The destination channel extender then sends a message to the source channel extender to resume data transmission.

The embodiment to be described is better understood after appreciating the following observations.

The number of dropped frames is a function of various factors, including:
 the distance between Fibre Channel nodes,
 source and destination data rates, and
 the buffer size of the Fibre Channel extender.

Normally, channel extenders' buffer capacity satisfies the criteria expressed in Equations 1 and 2, above. Satisfying such criteria guarantees error free operation. However, as mentioned above, there are numerous applications where the buffer capacity does not satisfy the criteria, and data rate imbalance may result in loss of data.

The inventors have recognized that channel extension technology should recover from a hardware fault that causes lossy transmission. The following embodiment detects a data rate mismatch that would lead to data loss, and takes appropriate measures to slow down the source data rate so that it matches the destination data rate. According to this embodiment, service outage intervals are reduced to the millisecond range.

The method described here manages data buffer occupancy in such a manner that, in case of a data rate mismatch, data overflow is minimized. Some features of the embodiment include:
 Detection of buffer buildup and overflow conditions,
 Computation of the transmit and receive data rates,
 Flow control mechanism initiation,
 Flow control mechanism termination,
 Verification of error free system operation,
 Other features not specifically listed.

Figure 7D:
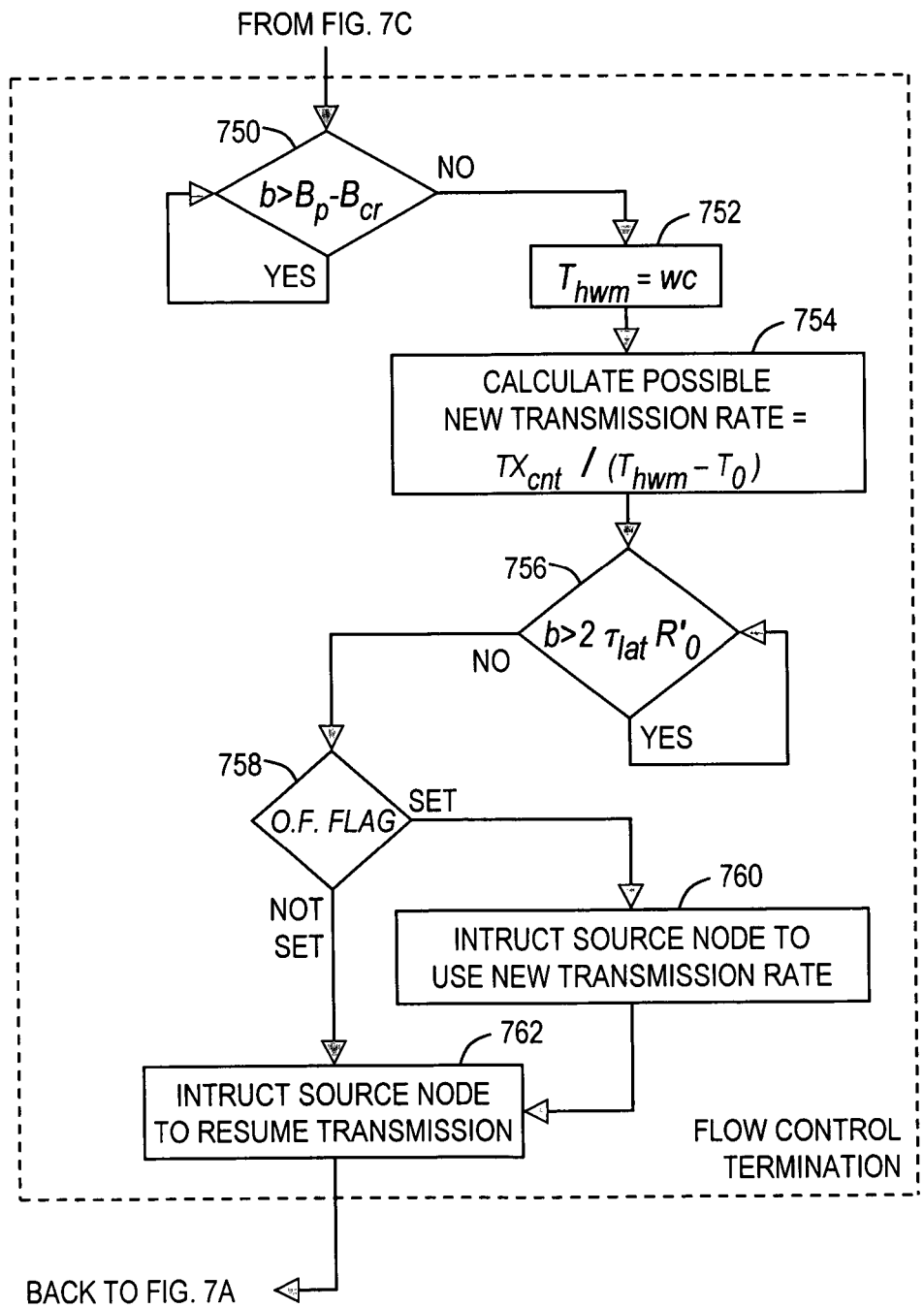
FIG. 7D shows a flowchart of one embodiment of flow control termination.

FIG. 7 shows system initialization and the relationship of the following figures:
 ▷FIG. 7A (steady state operation),
 ▷FIG. 7B (flow control invocation),
 ▷FIG. 7C (in-flight data management) and
 ▷FIG. 7D (flow control termination).

In one embodiment, the operations summarized in FIG. 7 are executed sequentially. In particular, each of the summarized operations may be implemented according to methods detailed in respective drawings in FIGS. 7A, 7B, 7C, 7D. However, it is understood that the operations need not be executed in a strict sequential manner, and each operation may be implemented in a manner other than that specifically shown in FIGS. 7A, 7B, 7C, 7D.

Referring to FIG. 7, the embodiment begins with system initialization. System initialization involves such operations as:
 Initializing and starting a "wall clock" (timer),
 Initializing the Fibre Channel link,
 Measuring round trip latency,
 Other operations not specifically listed.

In some embodiments, the Fibre Channel extenders compute round trip latency by exchanging time stamped messages. This approach is simple, accurate, and easy to implement. One embodiment for determining the round trip latency includes:
 Transmitting node sends a proprietary time stamped message encapsulated over SONET. The embedded time stamp is a copy of a wall clock $wc_1$ at a known instant relative to when the first bit of the message is transmitted.
 The receiving node validates, decodes and loops back the incoming message.
 The transmitting node, after receiving and validating the message, retrieves the time stamp from the message. Assuming $wc_2$ represents the wall clock when the message was received, the round trip latency $2\tau_{lat}$ is computed from $$\tau_{lat} = \frac{wc_2 - wc_1}{2}.$$

Referring to FIG. 7A, one embodiment of steady state operation is illustrated.

As a background to understanding FIG. 7A, incoming data is stored in CrB (credit buffer) using a first-in-first-out (FIFO) method. FIG. 8 shows a timing diagram of a receiving channel extender's buffer occupancy, b; receive data rate, $r_i$; and transmission data rate, $r_o$. Here, the receiving channel extender's buffer may be represented as credit buffer Crb 922 (see FIG. 9) and overflow buffer OvB 924 taken collectively. Buffer 922+924 is in the destination channel extender and is shown in simplified form in FIG. 8D.

The times and function values at times shown in FIGS. 8A, 8B, and 8C are presented in the following chart:

Legend for FIG. 8

| FIG. 8 reference | Time t | Function value |
|---|---|---|
| FIG. 8B: output | | |
| 800 | $T_0$ | $r_0 = R_o \to R_o'$ |
| FIG. 8A: buffer occupancy | | |
| 802 | $T_{lwm}$ | $b = B_0 + B_{cr}$ |
| 804 | $T_2$ | $b = B_p = B_0 + B_{cr} + B_{ovf}$ |
| 806 | $T_{hwm}$ | $b = B_p - B_{cr}$ |
| FIG. 8C: input | | |
| 830 | $T_1 = T_{lwm} + \tau_{lat}$ | $r_i = R_i \to R_i'$ |
| 832 | $T_{1h} = T_{hwm} + \tau_{lat}$ | $r_i = R_i' \to R_i$ |

Under normal operating conditions the transmit and receive data rates are equal ($R_i = R_o$), and CrB contains a small number $B_0$ of bytes ($b = B_0$). Here, $r_i = R_i$ and $r_o = R_o$ are the input and output data rates, respectively.

In FIG. 7A, decision block 702 indicates continuously monitoring of buffer occupancy b. Block 702 compares b with $B_0$. If b remains less than or equal to $B_0$, then there is no data rate mismatch ($R_i = R_o$). In this event, control remains in the FIG. 7A loop and steady state operation is maintained.

However, if there is a mismatch in the data rate, then $r_i > r_o$ and $B > B_0$. Accordingly, steady state operation (FIG. 7A) is exited and FIG. 7B (flow control invocation) is carried out.

FIG. 7B shows one embodiment of flow control invocation. At time $T_0$ (FIG. 8B time 800) assume that an equipment or transmission failure causes the drain (output) data rate to drop to $R_o'$. FIG. 7B block 712 indicates the assignment of the "wall clock" time at $T_0$ (800).

The data rate imbalance ($R_i > R'_o$) immediately after time 800 causes excess data to "pile up" in credit buffer CrB. Immediately after time 800 ($T_0$), buffer occupancy can be expressed as:

$$b = B_0 + (R_i - R'_o)(t - T_0)$$

During this phase, buffer monitoring logic or program steps invoke the flow control mechanism to send a message to the source node to stop data transmission until further notice. This mechanism is invoked when the CrB is full as determined when $b = B_0 + B_{cr}$.

More specifically, referring again to FIG. 7B, block 714 indicates ongoing comparison of buffer occupancy b to $B_0 + B_{cr}$. As long as b has not reached a value $B_0 + B_{cr}$, control remains within the monitoring loop including block 714. However, when b reaches or exceeds $B_0 + B_{cr}$, control passes to block 716. Block 716 indicates that the wall clock value wc at that time is assigned to $T_{lwm}$ (FIG. 8A time 802). Then, block 718 indicates the sending of a message to the source node to stop transmission. Thereafter, control passes to FIG. 7C (in-flight data management).

Each channel extender has the ability to implement a $TX_{cnt}$ counter, an $RX_{cnt}$ counter, and registers as needed. $TX_{cnt}$ contains a count of number of data bytes transmitted since it was reset. $TX_{cnt}$ is incremented when $b > B_0$ and a buffer read operation is performed to transmit a data byte. $RX_{cnt}$ contains a count of number of data bytes received since it was reset. $RX_{cnt}$ is incremented when $b > B_0$ and a buffer write operation is performed, when a data byte is received and stored.

Expressed in words rather than in flowchart form, one embodiment of flow control invocation involves:
Monitor buffer occupancy.
Increment $TX_{cnt}$ if a data byte is transmitted; increment $RX_{cnt}$ if a data byte is received.
Save copy of wall clock in $T_0$ at the instant when $b > B_0$.
Save copy of wall clock in $T_{lwm}$ at the instant when $b = B_{cr}$.
The destination channel extender sends a message to the source channel extender to stop data transmission (so that $R_i = 0$)
Compute:

$$\Delta R = \frac{B_{cr} - B_0}{T_{lwm} - T_0}$$

Compute measured data rates:

$$R_o = \frac{TX_{cnt}}{T_{lwm} - T_0}$$

$$R_i = \frac{RX_{cnt}}{T_{lwm} - T_0}$$

Verify that:

$$\Delta R = R_i - R_o$$

FIG. 7C shows one embodiment of in-flight data management. In-flight data management involves detecting whether a data overflow condition is present. Input and output bandwidth measurements, the latency measurement that was performed during the system initialization phase, along with OvB size, are used to compute an optimum input bandwidth.

The flow control message (FIG. 7B block 718) is sent by the destination channel extender at time $T_{lwm}$. Accordingly, the flow control message reaches the source channel extender a propagation delay latency $\tau_{lat}$ later, at a time $T_1 = T_{lwm} + \tau_{lat}$ (FIG. 8C time 830).

Upon receiving the flow control message, the source device immediately ceases data transmission. Due to latency, the last bit of in-flight data arrives at the destination channel extender at a time $T_2 = T_{lwm} + 2\tau_{lat}$ (FIG. 8A time 804).

Figure 9:
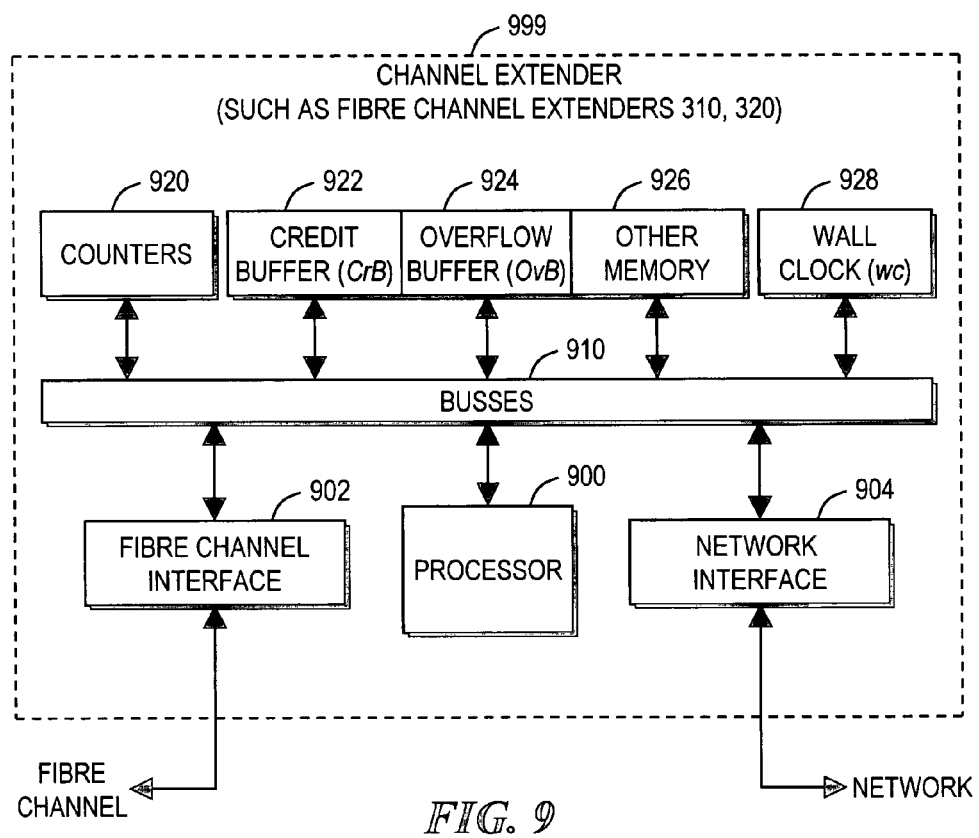
FIG. 9 shows one embodiment of an architecture for a channel extender.

Excess-in-flight data is saved in overflow buffer OvB (see FIG. 9 element 924). Lossy transmission results if OvB is not sufficiently large to store the excess data. During the in-flight data management phase, the embodiment detects overflow and computes number of bytes lost, if any. An overflow counter $OvF_{cnt}$ (in FIG. 9 element 920) keeps track of any lost data bytes. $OvF_{cnt}$ is reset before the in-flight data management phase is entered, and is incremented when a received data byte is discarded because OvF 924 is full.

Lossless transmission occurs if overflow buffer OvB 924 is sufficiently large to store the excess in-flight data. Two cases can arise:
OvB is partially full at time $T_2$ (FIG. 8A time 804), or
OvB may be completely full but there is no overflow, a scenario that occurs if $B_{ovf} = (R_i - R'_0) \cdot 2 \cdot \tau_{lat}$.

In contrast, lossy transmission occurs if the overflow buffer OvB 924 is not sufficiently large to accommodate the excess in-flight data. Lossy transmission thus occurs if $B_{ovf} < (R_i - R'_0) \cdot 2 \cdot \tau_{lat}$.

One embodiment of the in-flight data management involves the following steps, expressed in textual format:
Monitor buffer occupancy and set a flag if there is a data overflow.
Repeat above step if the last in-flight data byte has not arrived, that is, $wc = T_{2-} = T_2 - \epsilon$. Here, $\epsilon$ is a small fraction of latency and $T_2$ is FIG. 8A time 804.
Compute the receive and transmit data rates at $T_{2-}$ and verify that these rates are similar to those computed during flow control invocation (FIG. 7B):

$$R'_o = \frac{Tx_{cnt}}{T_{2-} - T_0}$$

$$R_i = \frac{Rx_{cnt}}{T_{2-} - T_0}$$

$$\Delta R'_i = \frac{Rx_{cnt} - TX_{cnt}}{T_{2-} - T_0}$$

Monitor buffer occupancy. When buffer occupancy changes ($db/dt \neq 0$), then:
(a) save wall clock value in $T_2$,
(b) save buffer occupancy b as $B_p$.
Verify that:

$$Ovf_{cnt} = 2 \cdot \tau_{lat} \cdot \Delta R - B_{ovf}$$

FIG. 7C shows one embodiment of in-flight data management expressed in flowchart format.

Block 730 indicates a preliminary step of resetting an overflow ("O.F.") flag to its inactive state (by one convention, inactive state is "0"). The flag remains reset until an overflow condition is detected.

Decision block 732 indicates the ongoing monitoring for an overflow condition.

If there is no overflow condition, then control passes directly to decision block 736. However, if an overflow condition is detected, then an overflow flag is set in block 734 before control passes to decision block 736.

Decision block 736 compares the value of the wall clock wc to $T'_2$, which is a small time $\epsilon$ before $T_2$. If wc$\leq T'_2$ then the final byte from the sender has not had time to arrive and control passes back to block 732 for continued monitoring for an overflow condition. However, if wc>$T_2$ then control passes out of loop 732-736 to decision block 738. At this time, the overflow flag is either set or not set, depending on whether an overflow condition was detected in block 732.

Block 738 analyzes the rate of change of buffer occupancy b with respect to time. The rate of change may be expressed as a first derivative of b, that is, as db/dt. If the rate of change of buffer occupancy is essentially zero, then buffer occupancy is not being reduced. Accordingly, control remains within the loop 738 to continue to monitor for any change in buffer occupancy.

However, a buffer occupancy change db/dt becoming non-zero indicates that buffer occupancy is being reduced. The reduction in buffer occupancy b derives from the sending node's stopping transmission at time $T_1$ which is reflected at the receiving channel extender $\epsilon$ before time $T_2$. Control passes to blocks 740 and 742. Block 740 indicates immediately saving a copy of the wall clock wc at time $T_2$ (FIG. 8A time 804). Block 742 indicates saving a copy of buffer occupancy b in $B_p$. $B_p$ is the value of b at FIG. 8A time 804. Thereafter, control passes to FIG. 7D (flow control termination).

FIG. 7D shows one embodiment of flow control termination. Flow control termination involves such functions as:

Computing a new output data rate $R'_0$ that may be less than output rate $R_0$ in a previous steady state condition, Sending a message to the sender to resume data transmission, possibly with the reduced transmission rate, other functions not specifically listed.

Briefly, if there is an overflow, the transmitting device is instructed to restrict the data transmission rate to a new, presumably smaller rate $R'_0$. In the absence of overflow (when Ovf is large enough to absorb excess data bytes), the source device is directed to resume data transmission at the same rate $R_0$ that was in effect when it was directed to stop data transmission.

Two conditions for a lossless transmission are:

$B_p \leq B_{ovf}$ and overflow flag=0.

Accordingly, indications of lossy transmission conditions include:

$B_p = B_{ovf}$ overflow flag=1.

One embodiment of flow control termination involves the following steps, expressed in textual format.

Save a copy of wall clock in $T_{hwm}$ when a minimum of $B_{cr}$ net bytes have been sent since the buffer occupancy slope turned negative, that is, when b has been reduced to a point at which $b \leq B_p - B_{cr}$.

Update the output data rate:

$$R'_o = \frac{TX_{cnt}}{T_{hwm} - T_0}$$

Wait until the buffer drains sufficiently so that it can be emptied in a round trip delay interval, that is, when $b \leq 2 \cdot \tau_{lat} \cdot R'_0$.

If the overflow flag is not set, send a message to the source device to resume data transmission at the same rate that was in effect when it was directed to stop data transmission. If the overflow flag is set, send a send a message to the source device to resume data transmission at a reduced rate $R'_0$.

FIG. 7D shows an embodiment of flow control termination expressed in flowchart format.

Decision block 750 indicates the ongoing comparison of b and $B_p - B_{cr}$. For as long as $b > B_p - B_{cr}$ control remains within the monitoring loop including decision block 750. However, when buffer occupancy b is reduced so that $b \leq B_p - B_{cr}$ then control passes to block 752. Block 752 indicates the definition of time $T_{hwm}$ to the value of the wall clock wc at that instant. $T_{hwm}$ is FIG. 8A time 806. Given $T_{hwm}$, a possible new data transmission rate $R'_0$ can be calculated in block 754 in accordance with the formula presented above. Control then passes to decision block 756.

Decision block 756 continually monitors buffer occupancy b for so long as $b > 2\tau_{lat} R'_0$. This test determines when the buffer has drained sufficiently so that it can be emptied in a round trip delay interval $2\tau_{lat}$. When b finally decreases to a point at which $b \leq 2\tau_{lat} R'_0$ then control passes to decision block 758.

Decision block 758 examines the overflow ("O.F.") flag. If the overflow flag has been set (see FIG. 7C block 734), then block 760 is carried out before control passes to block 762. Block 760 indicates sending an instruction to the source node specifying that a new transmission rate from block 754 is to be $R'_0$ to which is less than $R_0$. However, if the overflow flag is not set, then control bypasses block 760 to reach block 762 without specifying a reduced transmission rate. Block 762 indicates the sending of a message to the source node, instructing it to resume transmission of data. Thereafter, control returns to FIG. 7A (steady state operation).

Channel extenders may be embodied by any suitable systems for performing the methods described herein, the systems including at least one data processing element. Generally, these data processing elements may be implemented as any appropriate computer(s) employing technology known by those skilled in the art to be appropriate to the functions performed. The computer(s) may be implemented using a conventional general purpose computer programmed according to the foregoing teachings, as will be apparent to those skilled in the computer art. Appropriate software can readily be prepared by programmers based on the teachings of the present disclosure. Suitable programming languages operating with available operating systems may be chosen.

General purpose computers may implement the foregoing methods, in which the computer housing may house a CPU (central processing unit), memory such as DRAM (dynamic random access memory), ROM (read only memory), EPROM (erasable programmable read only memory), EEPROM (electrically erasable programmable read only memory), SRAM (static random access memory), SDRAM (synchronous dynamic random access memory), and Flash RAM (random access memory), and other special purpose logic devices such as ASICs (application specific integrated circuits) or configurable logic devices such GAL (generic array logic) and reprogrammable FPGAs (field programmable gate arrays).

Each computer may also include plural input devices (for example, keyboard, microphone, and mouse), and a display controller for controlling a monitor. Additionally, the computer may include a floppy disk drive; other removable media devices (for example, compact disc, tape, and removable magneto optical media); and a hard disk or other fixed high-density media drives, connected using an appropriate device bus such as a SCSI (small computer system interface) bus, an Enhanced IDE (integrated drive electronics) bus, or an Ultra DMA (direct memory access) bus. The computer may also include a compact disc reader, a compact disc reader/writer unit, or a compact disc jukebox, which may be connected to the same device bus or to another device bus.

FIG. 9 illustrates one embodiment of a channel extender 999. The FIG. 9 channel extender 999 is one example of an embodiment of channel extenders 310, 320 (FIG. 3).

In FIG. 9, a suitable processor 900 is connected to a Fibre Channel interface 902 and a network interface 904 by a set of busses 910. Fibre Channel interface 902 is further connected to a Fibre Channel communications link such as those between servers 110, 120 and channel extenders 310, 320, respectively. Network interface 904 is further connected to a network such as SONET cloud 330 (also in FIG. 3).

Various other elements are shown connected to processor 900 by busses 910. For example, a set of counters 920 is accessible to processor 900. In the embodiments discussed above, such counters include $TX_{cnt}$, $RX_{cnt}$, and $OvF_{cnt}$.

The channel extender also includes memory of various kinds suitable for various purposes. For purposes of illustration, FIG. 9 separately illustrates a credit buffer CrB 922, an overflow buffer OvB 924, and other memory 926. The receiving channel extender's buffer having an occupancy b (FIGS. 8A-8C) may be represented as credit buffer Crb 922 (FIG. 9) and overflow buffer OvB 924 taken collectively. Other memory 926 is understood to include program memory and scratchpad memory as required for particular implementations.

FIG. 9 also explicitly shows a wall clock wc 928.

As is readily understood by those skilled in the art, busses 910 include address, data, and control lines that are generally under control of processor 900. Element 910 is understood to encompass plural busses, including direct memory access busses, special purpose busses, and the like, that may be chosen for a particular application. Those skilled in the art readily understand that elements connected to busses 910 may also be partially or completely incorporated within processor 900 even though they are separately illustrated.

The invention envisions at least one computer readable medium. Examples of computer readable media include compact discs, hard disks, floppy disks, tape, magneto optical disks, PROMs (for example, EPROM, EEPROM, Flash EPROM), DRAM, SRAM, SDRAM. Stored on any one or on a combination of computer readable media is software for controlling both the hardware of the computer and for enabling the computer to interact with other elements, to perform the functions described above. Such software may include, but is not limited to, user applications, device drivers, operating systems, development tools, and so forth. Such computer readable media further include a computer program product including computer executable code or computer executable instructions that, when executed, causes a computer to perform the methods disclosed above. The computer code may be any interpreted or executable code, including but not limited to scripts, interpreters, dynamic link libraries, Java classes, complete executable programs, and the like.

From the foregoing, it will be apparent to those skilled in the art that a variety of methods, systems, computer programs on recording media, and the like, are provided.

The present disclosure supports a method of managing a communications link in which a first device (110) interfaces with a first channel extender (310) and in which a second device (120) interfaces with a second channel extender (320), and in which the first and second channel extenders (310, 320) communicate with each other through a communications medium (330). The method may involve (FIG. 7A) monitoring an occupancy ("b") of a receive buffer (922+924) in the first channel extender (310) during transmission from the second channel extender (320) at a first transmission rate ($R_0$); (FIG. 7B) at a first time ($T_{hwm}$) when the occupancy of the receive buffer (922+924) exceeds a first threshold ($B_0 + B_{cr}$), immediately instructing (718) the second channel extender (320) to cease transmission to the first channel extender (310); (FIG. 7C, 732) monitoring for an overflow condition in the receive buffer (922+924); if (FIG. 7D, 758) the overflow condition is present, specifying (760) that a future transmission to the first channel extender (310) be at a second transmission rate ($R'_0$) that is lower than the first transmission rate ($R_0$); and instructing (FIG. 7D, 762) the second channel extender (320) to resume transmission to the first channel extender (310).

The first transmission rate ($R_0$) may constitute a first steady-state transmission rate, and the second transmission rate ($R'_0$) may constitute a lower, second steady-state transmission rate that guards against future overflow conditions in the receive buffer (922+924).

The method may further involve causing the first and second channel extenders (310, 320) to communicate with respective first and second devices (110, 120) using a Fibre Channel standard, so that the first and second devices (110, 120) can communicate with each other based on only the Fibre Channel standard; and causing the first and second channel extenders (310, 320) to generate a false R_RDY signal (FIG. 4) to substantially eliminate idle periods that would otherwise occur in the Fibre Channel standard.

The first channel extender (310) may carries out the method with a receive buffer (922+924) that is sized large enough to have a buffer-to-buffer credit N defined by:

$$N \geq 2 \cdot \tau_{lat} \cdot \frac{r_f}{s_f} + 1$$

wherein $r_f$ is a Fibre Channel line rate; $s_f$ is a Fibre Channel frame size; and $\tau_{lat}$ is latency constituting a total elapsed for one data bit to travel between the two channel extenders.

The method may further involve waiting (736) a round trip latency period ($2\tau_{lat}$) after the step of immediately instructing (718) the second channel extender (320) to cease transmission, before a second time ($T_2$) of performing a step (738) of monitoring a rate of change (db/dt) of the receive buffer's occupancy (b).

The method may further involve, after the rate of change (db/dt) of the receive buffer's occupancy (b) becomes negative, monitoring (750) the receive buffer's occupancy (b) for a third time ($T_{hwm}$) at which the receive buffer's occupancy (b) reaches a second threshold (750).

The method may further involve, after the step (750) of monitoring the receive buffer's occupancy (b) for the third time ($T_{hwm}$) at which the receive buffer's occupancy (b) reaches the second threshold (750), calculating the second transmission rate ($R'_0$) as:

$$\frac{TX_{cnt}}{T_{hwm} - T_0}$$

wherein $TX_{cnt}$ is an amount of data emptied from the receive buffer since an initial data rate imbalance began, and after a minimum number ($B_{cr}$) bytes have been emptied from the receive buffer since the rate of change (db/dt) of the receive buffer's occupancy (b) became negative; $T_{hwm}$ is the third time, at which the receive buffer's occupancy (b) reached a second threshold (750); and $T_0$ is the first time ($T_0$), at which the occupancy of the receive buffer (922+924) exceeded the first threshold ($B_0+B_{cr}$).

The method may further involve monitoring (756) the receive buffer's occupancy (b) for when the receive buffer has drained sufficiently so that the receive buffer can be emptied in a round trip delay interval ($2\tau_{lat}$); and after the receive buffer has drained sufficiently, instructing (762) the second channel extender to resume transmission to the first channel extender.

The step of monitoring the receive buffer's occupancy (b) for when the receive buffer has drained sufficiently so that the receive buffer can be emptied in a round trip delay interval may involve comparing the receive buffer's occupancy (b) to $2\tau_{lat}R'_0$; wherein $2\tau_{lat}$ is a round-trip latency between the first and second channel extenders; and $R'_0$ is the second transmission rate.

If (FIG. 7D, 758) no overflow condition is present, the method may involve instructing (FIG. 7D, 762) the second channel extender (320) to resume transmission to the first channel extender (310) without specifying (760) that a future transmission to the first channel extender (310) be at the second transmission rate ($R'_0$) that is smaller than the first transmission rate ($R_0$).

The present disclosure further supports a computer program product including computer executable code or computer executable instructions that, when executed, causes a at least one computer to perform the methods described herein.

The present disclosure further supports a system, such as a channel extender, configured to perform the methods described herein.

Many alternatives, modifications, and variations will be apparent to those skilled in the art in light of the above teachings. While the present invention has been described with reference to one or more particular embodiments, those skilled in the art will recognize that many changes may be made thereto without departing from the spirit and scope of the present invention. It is therefore to be understood that within the scope of the appended claims and their equivalents, the invention may be practiced otherwise than as specifically described herein.

What is claimed is:

1. A method of managing a communications link in which a first device interfaces with a first channel extender and in which a second device interfaces with a second channel extender, and in which the first and second channel extenders communicate with each other through a communications medium, the method comprising: monitoring an occupancy of a receive buffer in the first channel extender during transmission from the second channel extender at a first transmission rate;

at a first time when the occupancy of the receive buffer exceeds a first threshold, immediately instructing the second channel extender to cease transmission to the first channel extender; monitoring for an overflow condition in the receive buffer;

d) if the overflow condition is present, specifying that a future transmission to the first channel extender be at a second transmission rate that is lower than the first transmission rate; and instructing the second channel extender to resume transmission to the first channel extender after the step of instructing the second channel extender to cease transmission to the first channel extender, wherein the first channel extender carries out the method with a receive buffer that is sized large enough to have a buffer-to-buffer credit N defined by:

$N \geq 2 \cdot \tau_{lat} \cdot rf/sf+1$ wherein:
   rf is a Fibre Channel line rate;
   sf is a Fibre Channel frame size; and
   $\Gamma_{lat}$ is latency constituting a total elapsed for one data bit to travel between the two channel extenders.

2. The method of claim 1, wherein:
   the first transmission rate constitutes a first steady-state transmission rate; and
   the second transmission rate constitutes a lower, second steady-state transmission rate that guards against future overflow conditions in the receive buffer.

3. A computer-readable medium having an encoded computer program product including computer executable code or computer executable instructions that, when executed, causes at least one computer to perform the method of claim 2.

4. A system configured to perform the method of claim 2.

5. The method of claim 1, further comprising:
   causing the first and second channel extenders to communicate with respective first and second devices using a Fibre Channel standard, so that the first and second devices can communicate with each other based on only the Fibre Channel standard; and
   causing the first and second channel extenders to generate a false R_RDY signal to substantially eliminate idle periods that would otherwise occur in the Fibre Channel standard.

6. The method of claim 1, further comprising:
   waiting a round trip latency period after the step of immediately instructing the second channel extender to cease transmission, before a second time of performing a step of monitoring a rate of change of the receive buffer's occupancy.

7. The method of claim 6, further comprising:
   after the rate of change of the receive buffer's occupancy becomes negative, monitoring the receive buffer's occupancy for a third time at which the receive buffer's occupancy reaches a second threshold.

8. A computer-readable medium having an encoded computer program product including computer executable code or computer executable instructions that, when executed, causes at least one computer to perform the method of claim 6.

9. A system configured to perform the method of claim 5.

10. The method of claim 1, wherein if no overflow condition is present, the method comprises:
    instructing the second channel extender to resume transmission to the first channel extender without specifying that a future transmission to the first channel extender be at the second transmission rate that is smaller than the first transmission rate.

11. A computer-readable medium having an encoded computer program product including computer executable code or computer executable instructions that, when executed, causes at least one computer to perform the method of claim 10.

12. A computer-readable medium having an encoded computer program product including computer executable code or computer executable instructions that, when executed, causes at least one computer to perform the method of claim 1.

13. A system configured to perform the method of claim 1.

14. A method of managing a communications link in which a first device interfaces with a first channel extender and in which a second device interfaces with a second channel extender, and in which the first and second channel extenders communicate with each other through a communications medium, the method comprising:
   a) monitoring an occupancy of a receive buffer in the first channel extender during transmission from the second channel extender at a first transmission rate;
   b) at a first time when the occupancy of the receive buffer exceeds a first threshold, immediately instructing the second channel extender to cease transmission to the first channel extender;
   c) monitoring for an overflow condition in the receive buffer;
   d) if the overflow condition is present, specifying that a future transmission to the first channel extender be at a second transmission rate that is lower than the first transmission rate; and
   e) instructing the second channel extender to resume transmission to the first channel extender after the step of instructing the second channel extender to cease transmission to the first channel extender,
   causing the first and second channel extenders to communicate with respective first and second devices using a Fibre Channel standard, so that the first and second devices can communicate with each other based on only the Fibre Channel standard; and causing the first and second channel extenders to generate a false R_RDY signal to substantially eliminate idle periods that would otherwise occur in the Fibre Channel standard,
   wherein the first channel extender carries out the method with a receive buffer that is sized large enough to have a buffer-to-buffer credit N defined by:

$$N \geq 2 \cdot \tau_{lat} \cdot \frac{r_f}{s_f} + 1$$

wherein:
   $r_f$ is a Fibre Channel line rate;
   $s_f$ is a Fibre Channel frame size; and
   $\tau_{lat}$ is latency constituting a total elapsed for one data bit to travel between the two channel extenders.

15. A method of managing a communications link in which a first device interfaces with a first channel extender and in which a second device interfaces with a second channel extender, and in which the first and second channel extenders communicate with each other through a communications medium, the method comprising:
   a) monitoring an occupancy of a receive buffer in the first channel extender during transmission from the second channel extender at a first transmission rate;
   b) at a first time when the occupancy of the receive buffer exceeds a first threshold, immediately instructing the second channel extender to cease transmission to the first channel extender;
   c) monitoring for an overflow condition in the receive buffer;
   d) if the overflow condition is present, specifying that a future transmission to the first channel extender be at a second transmission rate that is lower than the first transmission rate; and
   e) instructing the second channel extender to resume transmission to the first channel extender after the step of instructing the second channel extender to cease transmission to the first channel extender;
   waiting a round trip latency period after the step of immediately instructing the second channel extender to cease transmission, before a second time of performing a step of monitoring a rate of change of the receive buffer's occupancy that would otherwise occur in the Fibre Channel standard;
   after the rate of change of the receive buffer's occupancy becomes negative, monitoring the receive buffer's occupancy for a third time at which the receive buffer's occupancy reaches a second threshold,
   further comprising, after the step of monitoring the receive buffer's occupancy for the third time at which the receive buffer's occupancy reaches the second threshold:
   calculating the second transmission rate as:

$$\frac{TX_{cnt}}{T_{hwm} - T_0}$$

wherein:
   $TX_{cnt}$ is an amount of data emptied from the receive buffer since an initial data rate imbalance began, and after a minimum number bytes have been emptied from the receive buffer since the rate of change of the receive buffer's occupancy became negative;
   $T_{hwm}$ is the third time, at which the receive buffer's occupancy reached a second threshold; and
   $T_0$ is the first time, at which the occupancy of the receive buffer exceeded the first threshold.

16. The method of claim 15, further comprising:
   monitoring the receive buffer's occupancy for when the receive buffer has drained sufficiently so that the receive buffer can be emptied in a round trip delay interval; and
   after the receive buffer has drained sufficiently, instructing the second channel extender to resume transmission to the first channel extender.

17. The method of claim 16, wherein the step of monitoring the receive buffer's occupancy for when the receive buffer has drained sufficiently so that the receive buffer can be emptied in a round trip delay interval includes:
   comparing the receive buffer's occupancy to $2\tau_{lat}R'_0$;
wherein:
   $2\tau_{lat}$ is a round-trip latency between the first and second channel extenders; and
   $R'_0$ is the second transmission rate.

* * * * *